(12) United States Patent
Sakai et al.

(10) Patent No.: US 10,137,890 B2
(45) Date of Patent: Nov. 27, 2018

(54) OCCLUDED OBSTACLE CLASSIFICATION FOR VEHICLES

(71) Applicant: Toyota Motor Engineering & Manufacturing North America, Inc., Erlanger, KY (US)

(72) Inventors: Katsuhiro Sakai, Ann Arbor, MI (US); Xue Mei, Ann Arbor, MI (US); Nobuhide Kamata, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 9 days.

(21) Appl. No.: 15/195,760

(22) Filed: Jun. 28, 2016

(65) Prior Publication Data

US 2017/0369051 A1    Dec. 28, 2017

(51) Int. Cl.
*B60W 30/09* (2012.01)
*G05D 1/00* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS 8,589,014 B2    11/2013   Fairfield et al.
9,164,511 B1 *  10/2015   Ferguson ............ G05D 1/0231
(Continued)

FOREIGN PATENT DOCUMENTS

| JP | 11149557 A | 6/1999 |
| JP | 2009301400 A | 12/2009 |
| JP | 2012238151 A | 12/2012 |

OTHER PUBLICATIONS

Petrovskaya et al., "Model Based Vehicle Detection and Tracking for Autonomous Urban Driving", retrieved from the Internet: <http://cs.stanford.edu/group/manips/publications/pdfs/Petrovskaya_2009_AURO.pdf>, [retrieved Apr. 12, 2016], published online Apr. 1, 2009 (17 pages).

(Continued)

Primary Examiner — Tamara L Weber
(74) Attorney, Agent, or Firm — Christopher G. Darrow; Darrow Mustafa PC

(57) ABSTRACT

Obstacles located in an external environment of a vehicle can be classified. At least a portion of the external environment can be sensed using one or more sensors to acquire sensor data. An obstacle candidate can be identified based on the acquired sensor data. An occlusion status for the identified obstacle candidate can be determined. The occlusion status can be a ratio of acquired sensor data for the obstacle candidate that is occluded to all acquired sensor data for the obstacle candidate. A classification for the obstacle candidate can be determined based on the determined occlusion status. A driving maneuver for the vehicle can be determined at least partially based on the determined classification for the obstacle candidate. The vehicle can be caused to implement the determined driving maneuver. The vehicle can be an autonomous vehicle.

20 Claims, 7 Drawing Sheets

(51) Int. Cl.
G05D 1/02 (2006.01)
B60W 10/04 (2006.01)
B60W 10/18 (2012.01)
B60W 10/20 (2006.01)

(52) U.S. Cl.
CPC ........... G05D 1/0088 (2013.01); G05D 1/024 (2013.01); *B60W 2420/52* (2013.01); *B60W 2550/10* (2013.01); *B60W 2710/18* (2013.01); *B60W 2710/20* (2013.01); *B60W 2720/00* (2013.01); *B60W 2720/10* (2013.01)

(56) References Cited

U.S. PATENT DOCUMENTS

| | | | |
|---|---|---|---|
| 9,216,745 | B2 | 12/2015 | Beardsley et al. |
| 9,432,929 | B1* | 8/2016 | Ross .................... G05D 1/0274 |
| 2012/0316725 | A1 | 12/2012 | Trepagnier et al. |
| 2014/0139676 | A1* | 5/2014 | Wierich ................ H04N 5/247 348/148 |
| 2014/0330456 | A1 | 11/2014 | Lopez Morales et al. |
| 2015/0045994 | A1 | 2/2015 | Krishna et al. |
| 2015/0272413 | A1 | 10/2015 | Miyake et al. |
| 2015/0334269 | A1* | 11/2015 | Yokota ................... G06T 7/277 382/103 |
| 2016/0221500 | A1 | 8/2016 | Sakai et al. |
| 2017/0185089 | A1 | 6/2017 | Mei et al. |

OTHER PUBLICATIONS

Petrovskaya, "Towards Dependable Robotic Perception", A Dissertation Submitted to the Department of Computer Science and the Committee on Graduate Studies of Stanford University, Jun. 2011 (226 pages).

Vu et al., "Online Localization and Mapping with Moving Object Tracking in Dynamic Outdoor Environments", IEEE Intelligent Vehicles Symposium, Istanbul, Turkey, Jun. 13-15, 2007, pp. 190-195 (6 pages).

Montemerlo et al., "Junior: The Stanford Entry in the Urban Challenge", retrieved from the Internet: <http://robots.stanford.edu/papers/junior08.pdf>, [retrieved Apr. 12, 2016], undated (31 pages).

Coue et al., "Bayesian Occupancy Filtering for Multitarget Tracking: an Automotive Application", The International Journal of Robotics Research, Jan. 2006, pp. 19-30, retrieved from the Internet: <https://hal.inria.fr/inria-00182004/document>, [retrieved Apr. 12, 2016] (13 pages).

Baumann et al., "Occlusion-Free Path Planning with a Probabilistic Roadmap", IEEE, International Conference on Intelligent Robots and Systems, 2008, retrieved from the Internet: <http://www.cs.ubc.ca/~little/links/linked-papers/OcclusionFreePathPlanning_final.pdf>, [retrieved Apr. 12, 2016] (6 pages).

Wikipedia, "Ray tracing (graphics)", retrieved from the Internet: <https://en.wikipedia.org/wiki/Ray_tracing_(graphics)>, [retrieved Apr. 12, 2016] (10 pages).

Pfaff et al., "An Efficient Extension of Elevation Maps for Outdoor Terrain Mapping", Department of Computer Science, University of Freiburg, Germany, undated (12 pages).

Pepik et al., "Occlusion Patterns for Object Class Detection", CVPR, 2013, pp. 3286-3293 (8 pages).

Heckman et al., "Potential Negative Obstacle Detection by Occlusion Labeling", IEEE/RSJ International Conference on Intelligent Robots and Systems, Oct. 29-Nov. 2, 2007, pp. 2168-2173 (6 pages).

Xiang et al., "Object Detection by 3D Aspectlets and Occlusion Reasoning", ICCV, 2013, pp. 530-537 (8 pages).

Hsiao et al., "Coherent Occlusion Reasoning for Instance Recognition", The Robotics Institute, Carnegie Mellon University, Pittsburgh, PA, 2013 (5 pages).

Douillard et al., "A 3D Laser and Vision Based Classifier", Australian Centre for Field Robotics, Sydney, Australia, 2009 (6 pages).

Lindner et al., "Multi-view point cloud fusion for LiDAR based cooperative environment detection", Advances in Radio Science, 2015, pp. 209-215 (7 pages).

Er et al., "Perception of Dynamic Environments in Autonomous Robots", Proceedings of the 17th World Congress, The International Federation of Automatic Control, Seoul, Koreal, Jul. 6-11, 2008, pp. 8226-8231 (6 pages).

Biswas, "Hybrid Markov / Non-Markov Localization for Long-Term Autonomy of Mobile Robots in Varying Indoor Environments", The Robotics Institute, Carnegie Mellon University, Pittsburgh, PA, Thesis Proposal, undated (83 pages).

Teichman et al., "Towards 3D Object Recognition via Classification of Arbitrary Object Tracks", IEEE International Conference on Robotics and Automation, Shanghai International Conference Center, May 9-13, 2011, pp. 4034-4041 (8 pages).

Felzenswalb et al., "Efficient Graph-Based Image Segmentation", International Journal of Computer Vision, 2004, pp. 167-181 (15 pages).

Kuthirummal et al., "A Graph Traversal based Algorithm for Obstacle Detection using Lidar", IEEE/RSJ International Conference on Intelligent Robots and Systems, Sep. 25-30, 2011, San Francisco, CA, USA, pp. 3874-3880 (7 pages).

Nguyen, "Constructing Drivability Maps From 3D Laser Range Data for Autonomous Vehicles", pp. 1-17 (17 pages).

* cited by examiner

US 10,137,890 B2

OCCLUDED OBSTACLE CLASSIFICATION FOR VEHICLES

FIELD

The subject matter described herein relates in general to vehicles and, more particularly, to the operation of vehicles relative to occluded obstacles in the surrounding external environment.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment. The presence of some objects may affect the determination of how to navigate and/or maneuver the vehicle through the surrounding environment.

SUMMARY

In one respect, the subject matter described herein is directed to an obstacle classification method for a vehicle. The method can include sensing, using one or more sensors, at least a portion of the external environment of the vehicle to acquire sensor data. The method can include identifying, using a processor, an obstacle candidate based on the acquired sensor data. The method can further include determining an occlusion status for the identified obstacle candidate. The occlusion status can be a ratio of acquired sensor data for the obstacle candidate that is occluded to all acquired sensor data for the obstacle candidate. The method can also include determining a classification for the obstacle candidate based at least partially on the determined occlusion status. The method can include determining a driving maneuver for the vehicle at least partially based on the determined classification for the obstacle candidate. The method can include causing the vehicle to implement the determined driving maneuver.

In another respect, the present disclosure is directed to an obstacle classification system for a vehicle. The system can include one or more sensors. The one or more sensors can be configured to acquire sensor data of at least a portion of an external environment of the vehicle. The system can also include a processor operatively connected to the sensor system. The processor can be programmed to initiate executable operations. The executable operations can include identifying an obstacle candidate based on the acquired sensor data. The executable operations can also include determining an occlusion status for the identified obstacle candidate. The occlusion status can be a ratio of acquired sensor data for the obstacle candidate that is occluded to all acquired sensor data for the obstacle candidate. The executable operations can also include determining a classification for the obstacle candidate based at least partially on the determined occlusion status. The executable operations can further include determining a driving maneuver for the vehicle at least partially based on the determined classification for the obstacle candidate. The executable operations can include causing the vehicle to implement the determined driving maneuver.

DETAILED DESCRIPTION

Figure 1:
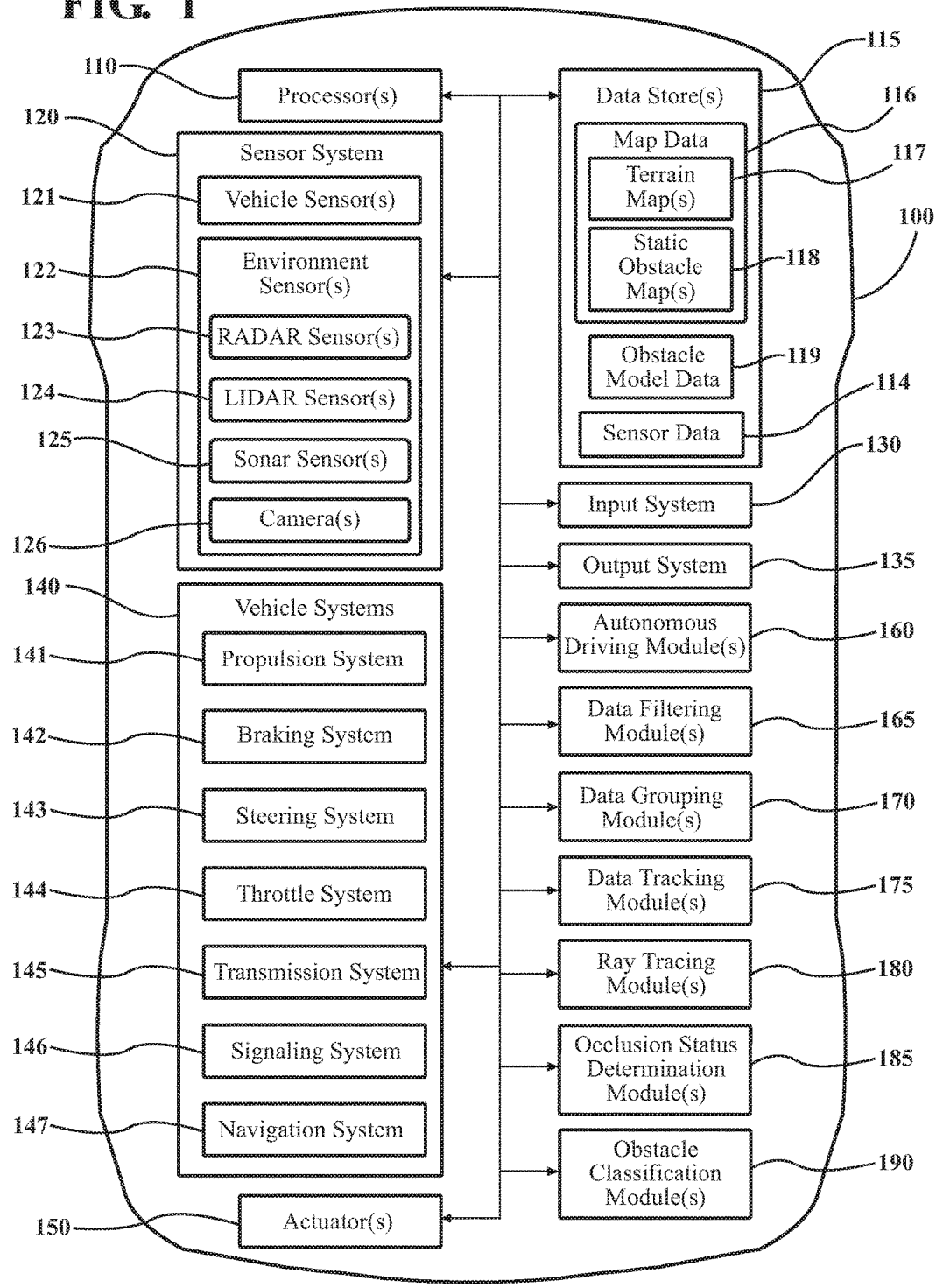
FIG. 1 is an example of a vehicle configured for obstacle classification.

This detailed description relates to the classification of obstacles located in an environment external of a vehicle. An obstacle candidate in the external environment can be identified based on the acquired sensor data. An occlusion status for the identified obstacle candidate can be determined. A classification for the obstacle candidate based on the determined occlusion status. A driving maneuver for the vehicle can be determined at least partially based on the determined classification for the obstacle candidate. The vehicle can be caused to implement the determined driving maneuver. The present detailed description relates to systems, methods and computer program products that incorporate one or more of such features. In at least some instances, such systems, methods and computer program products can improve safety and/or performance of a vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In one or more arrangements, the vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the vehicle 100 can be highly automated or completely automated. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. One example of a semi-autonomous operational mode is when an adaptive cruise control system is activated.

The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

The vehicle 100 can be configured to be switched between the various operational modes, including between any of the above-described operational modes. Such switching can be implemented in any suitable manner, now known or later developed. The switching can be performed automatically, selectively, or it can be done responsive to receiving a manual input or request.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor(s) 110 can be an electronic control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface. The terrain map(s) 117 can be high quality and/or highly detailed.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated continuously, periodically, irregularly, or even randomly to reflect additions, removals, and/or changes within a mapped area.

In one or more arrangements, the one or more data stores 115 can include obstacle model data 119. The obstacle model data 119 can include one or more images or other data of a plurality of different potential obstacles (e.g., vehicles) or portions thereof. Arrangements will be described herein in connection with the obstacles being vehicles, but it will be understood that arrangements are not limited to vehicles. Indeed, the obstacle model data 119 can include one or more images or other data of non-vehicular objects. The images can be provided in any suitable format.

The images or other data may be of one or more portions of the exterior of at least a portion of a plurality of different vehicles. For instance, the images can be of at least a portion of a vehicle. In some instances, the obstacle model data 119 can include images or other data of a full vehicle, including different views of the vehicle. In some instances, the obstacle model data 119 can include images or other data of a partially occluded vehicle. The obstacle model data 119 can include images or other data for a single vehicle or a plurality of different vehicles. The obstacle model data 119 can include measurements or other aspects of any obstacle included in the obstacle model data 119.

Figure 3:
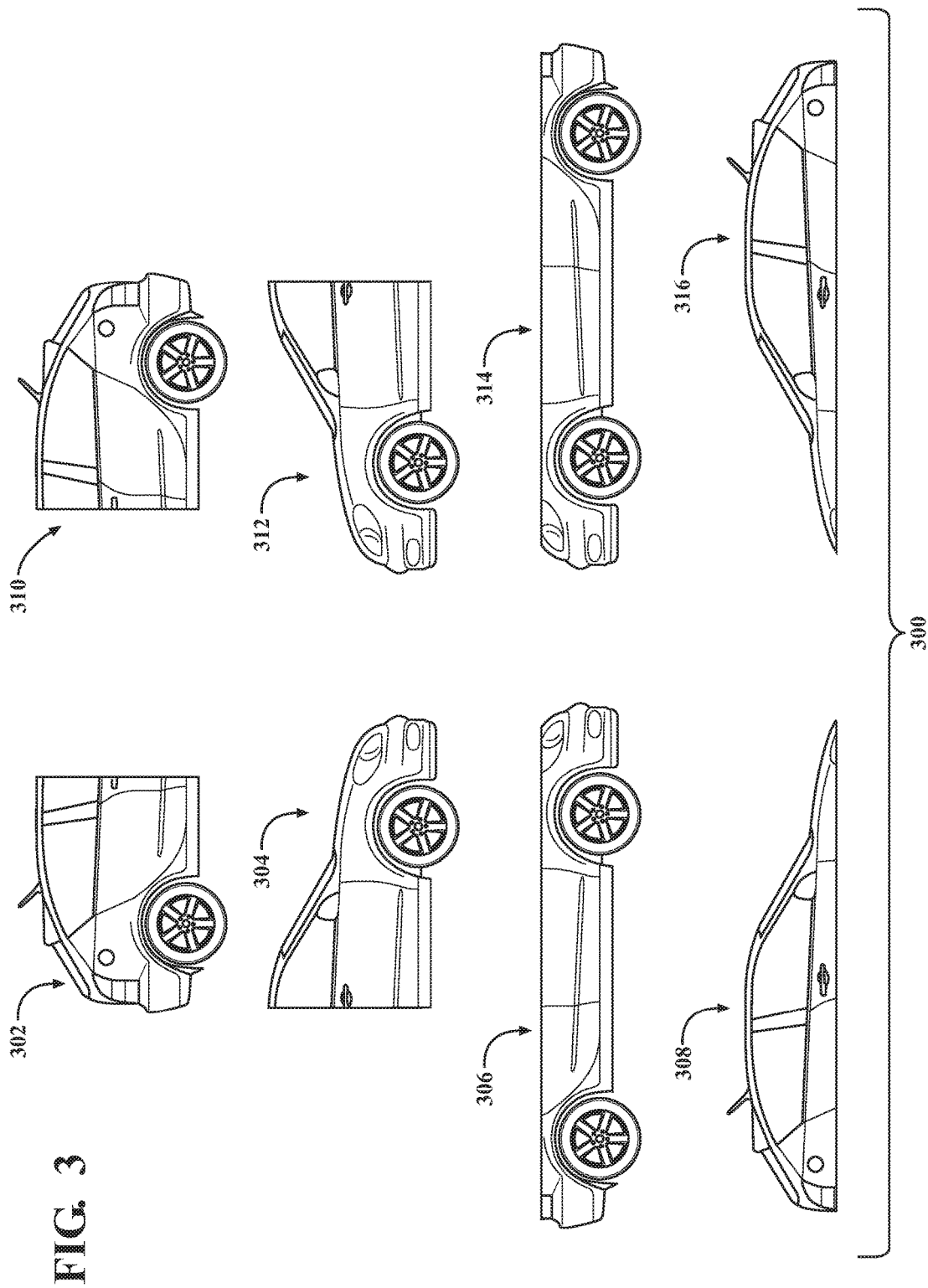
FIG. 3 is an example of a partially occluded obstacle model.

FIG. 3 is an example of a partially occluded obstacle model 300 for one vehicle. In this example, about half of the vehicle is occluded in any view. The partially occluded obstacle model 300 can include a rear half right side model 302, a front half right side model 304, a bottom half right side model 306, a top half right side model 308, a rear half left side model 310, a front half left side model 312, a bottom half left side model 314, and a top half left side model 316. While note shown, the partially occluded obstacle model 300 can include a left half front view model, a right half front view model, a bottom half front view model, a top half front view model, a left half rear view model, a right half rear view model, a bottom half rear view model, and/or a top half rear view model. The partially occluded obstacle model 300 can include model data for a single vehicle or a plurality of different vehicles. Also, while the partially occluded obstacle model 300 is shown as having model data for about half of the vehicle, it will be appreciated that model data of other portions of the vehicle can be provided (e.g., about 10%, about 20%, about 25%, about 30%, about ⅓%, about 40%, about 60%, about ⅔%, about 70%, about 75%, about 80%, and/or about 90% view of the vehicle front different sides of the vehicle).

The one or more data stores 115 can include sensor data 114. In this context, "sensor data" means any information about the sensors that the vehicle 100 is equipped with, including the capabilities, parameters, characteristics, ranges, and other information about such sensors. As will be explained below, the vehicle 100 can include a sensor system 120. The sensor data 114 can relate to one or more sensors of the sensor system 120. As an example, in one or more arrangements, the sensor data 114 can include information on one or more LIDAR sensors 124 of the sensor system 120. Such information can include, for example, the number of outbound sensor signals emitted by the LIDAR or other sensor(s), the maximum working range of one or more of such outbound sensor signals, the arrangement of the outbound sensor signals, the orientation of the outbound sensor signals, and/or the frequency at which the outbound sensor signals are emitted. Such data can be obtained from any suitable source, including a sensor manufacturer, the vehicle manufacturer, and/or based on test data, just to name a few possibilities.

In some instances, at least a portion of the map data 116, the obstacle model data 119, and/or the sensor data 114 can be located in one or more data stores 115 located onboard the vehicle 100. Alternatively or in addition, at least a portion of the map data 116, the obstacle model data 119, and/or the sensor data 114 can be located in one or more data stores 115 that are located remote from the vehicle 100. The map data 116, the obstacle model data 119, and/or the sensor data 114 can be obtained by the vehicle 100 from any suitable source, including a sensor manufacturer, the vehicle manufacturer, and/or based on test data, just to name a few possibilities.

The data store(s) 115 can be communicatively linked to one or more elements of the vehicle 100 through one or more communication networks. As used herein, the term "communicatively linked" can include direct or indirect connections through a communication channel or pathway or another component or system. A "communication network" means one or more components designed to transmit and/or receive information from one source to another. The data store(s) 115 and/or one or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and or satellite-based wireless network, GSM, TDMA, CDMA, WCDMA networks or the like). The communication network can include wired communication links and/or wireless communication links. The communication network can include any combination of the above networks and/or other types of networks.

As noted above, the vehicle 100 can include the sensor system 120. The sensor system 120 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can detect, determine, assess, monitor, measure, quantify and/or sense information about the vehicle 100 itself (e.g., position, orientation, speed, etc.).

Alternatively or in addition, the sensor system 120 can include one or more environment sensors 122 configured to acquire, detect, determine, assess, monitor, measure, quantify and/or sense driving environment data. "Driving environment data" includes and data or information about the external environment in which a vehicle is located or one or more portions thereof. For example, the one or more environment sensors 122 can detect, determine, assess, monitor, measure, quantify and/or sense obstacles in at least a portion of the external environment of the vehicle 100 and/or information/data about such obstacles. Such obstacles may be stationary objects and/or dynamic objects. The one or more environment sensors 122 can detect, determine, assess, monitor, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more environment sensors 122 can include a global navigation satellite system (GNSS), a global positioning system (GPS), a navigation system (which can be the navigation system 147 described below), and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, one or more cameras 126, and/or one or more ranging sensors. Such sensors can be used to detect, determine, assess, monitor, measure, quantify and/or sense, directly or indirectly, the presence of one or more obstacles in the external environment of the vehicle 100, the position or location of each detected obstacle relative to the vehicle 100, the distance between each detected obstacle and the vehicle 100 in one or more directions (e.g. in a longitudinal direction, a lateral direction and/or other direction(s)), the elevation of each detected obstacle, the speed of each detected obstacle and/or the movement of each detected obstacle.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

It should be noted that at least some of the environment sensors 122 can send outbound sensor signals into the external environment of the vehicle 100 and can receive return sensor signals, which may reflect off of obstacles located in the external environment. Differences between the outbound sensor signals and their corresponding return sensor signals, as well as other information, can be used for detection purposes in any suitable manner, now known or later developed.

As an example, the LIDAR sensor 124 can emit at least one outbound sensor signal into the external environment. In some instances, the LIDAR sensor 124 can emit a plurality of outbound sensor signals. In some instances, the outbound sensor signals can be emitted from a common signal source. In other instances, the outbound sensor signals can be emitted from a plurality of signal sources. The outbound sensor signals can be arranged and/or distributed in any suitable manner. In one or more arrangements, the outbound sensor signals can be equally spaced apart. The outbound sensor signals can be emitted in a substantially two-dimensional array, or they can be emitted in a three-dimensional array. In one or more arrangements, the outbound sensor signals can be emitted in a substantially semi-circular array or in a substantially semi-spherical array. Information about the outbound sensor signals can be included in the sensor data 114.

The vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display. Alternatively or in addition, the output system 135 may include an earphone and/or speaker. Some components of the vehicle 100 may serve as both a component of the input system 130 and a component of the output system 135.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can execute various vehicle functions and/or to transmit data to, receive data from, interact with, and/or control the vehicle 100 or one or more systems thereof (e.g. one or more of vehicle systems 140).

The vehicle 100 can include one or more data filtering modules 165. The data filtering module(s) 165 can filter out data acquired or collected by the sensor system 120 to remove (or otherwise ignore) data that is not located within one or more predefined parameters. As an example, the one or more parameters can include one or more lateral boundaries of the road (e.g., road markers, lane marker, curb, median, shoulder, etc.), a predetermined lateral distance from a road marker (e.g., about 1 meter or about 2 meters in the lateral direction from an outermost lane marker of a road), a height boundary, and/or a ground boundary, just to name a few possibilities. The data filtering module(s) 165 can be operatively connected to obtain map data 116 for the driving environment of the vehicle 100. The acquired sensor data can be compared to the map data 116. If acquired sensor data is outside of the one or more parameters, the sensor data can be filtered out. If acquired sensor data is within the one or more parameters, the sensor data is not filtered out.

The vehicle 100 can include one or more data grouping modules 170. The data grouping module(s) 170 can analyze sensor data acquired by the sensor system 120. For instance, the data grouping module(s) 170 can analyze the object data points acquired by the LIDAR sensor(s) 124 and/or other environment sensor(s) 122 by grouping the object data points together to identify one or more obstacle candidates. In one or more arrangements, the data grouping module(s) 170 can group the object data points, as filtered out by the data filtering module(s) 165, to identify one or more obstacle candidates. The data grouping module(s) 170 can use any suitable grouping technique. As an example, the data grouping module(s) 170 can use one or more segmentation techniques, such as a graph-based segmentation algorithm. Some examples of suitable techniques to segment three dimensional point clouds into clusters are described in an article entitled "Efficient Graph-Based Image Segmentation" by P. Felzenszwalb et al., which is incorporated herein by reference. In one or more arrangements, such analyzing can be performed after the data points have been filtered out by the data filtering module(s) 165.

The vehicle 100 can include one or more data tracking modules 175. In one or more arrangements, the data tracking module(s) 175 can track one or more obstacle candidates and/or one or more object data points over a period of time. For example, the data tracking module(s) 175 can track the LIDAR point segments and/or other environment sensor data points for each obstacle candidate between different time frames. The data tracking module(s) 175 can provide information and/or properties about obstacle candidates, including, for example, the speed of an obstacle candidates.

The vehicle 100 can include one or more ray tracing modules 180. In one or more arrangements, the ray tracing module(s) 180 can generate a projected path for the one or more of the outbound sensor signals transmitted into the external environment by one or more sensors of the sensor system 120. The projected path for the one or more of the outbound sensor signals can be generated using the sensor data 114 and/or data acquired by the sensor system 120. With such information, the projected path can be oriented, arranged, and/or configured to accurately represent the actual outbound sensor signal. The projected path can extend from an origin (e.g., the sensor signal transmitter) to a distance corresponding to the maximum working range of the particular sensor. The projected path can be substantially linear. The projected path can be oriented corresponding to an actual orientation of the outbound sensor signal(s) transmitted from the sensor system 120. Thus, the projected path can accurately represent the actual path of the outbound sensor signal(s) transmitted from the sensor system 120.

The ray tracing module(s) 180 can analyze the projected path relative to map data 116 (e.g., the terrain map(s) 117 and/or the static obstacle map(s) 118). For example, the projected path can be analyzed relative to map data 116 to determine whether the outbound sensor signal, within its maximum working range, should have hit an obstacle in the external environment (e.g., the ground or a static obstacle) which would have resulted in receiving a return sensor signal. For instance, if the projected travel path of the outbound sensor signal intersects with a ground surface defined by the terrain map 117 and/or any portion of a static obstacle defined by the static obstacle map 118, then a return sensor signal would be expected for that outbound sensor signal. If, however, the projected travel path of the outbound sensor signal does not intersect with a ground surface defined by the terrain map 117 and/or any portion of a static obstacle defined by the static obstacle map 118, then a return signal may or may not be received.

A received return signal would be indicative of another obstacle that is not reflected in the map data 116. The lack of a return sensor signal can be indicative of several possibilities. In one instance, the lack of a return signal can indicate a hidden obstacle located in the path of the outbound sensor signal. Examples of hidden obstacles include highly reflective obstacles (e.g., mirror like objects), black obstacles (e.g., objects that absorb sensor signals), and/or an obstacle that otherwise prevents a return signal from being reflected back to the sensor system. A hidden obstacle is one that is effectively invisible to a particular environment sensor (e.g., a LIDAR sensor 124) such that it cannot be detected by that particular environment sensor alone. Alternatively, the lack of a return signal can be indicative of the fact that the outbound sensor signal did not hit any obstacle within its maximum working range. In such case, no obstacle exists on the travel path of the outbound sensor signal (e.g., on the travel path of a LIDAR sensor ray).

The vehicle 100 can include one or more occlusion status determination modules 185. The occlusion status determination module(s) 185 can analyze individual sensor data points for an obstacle candidate to determine which of the sensor data points are occluded. The occlusion status determination module(s) 185 can do so in any suitable manner. For instance, for a given obstacle candidate, the occlusion status determination module(s) 185 can determine that all border data points of the obstacle candidate are occluded. More particularly, for a given obstacle candidate, occlusion status determination module(s) 185 can determine that all border data points of the obstacle candidate that are located substantially adjacent to object data points for another obstacle candidate are occluded. Alternatively or in addition, the occlusion status determination module(s) 185 can determine that sensor data that is suspect, incomplete, or otherwise unreliable is occluded. Still alternatively or in addition, the occlusion status determination module(s) 185 can treat unexpected sensor data as occluded. In some instance, unexpected sensor data can include sensor data that would not be expected to be obtained when ray tracing is applied to map data 116 for the current driving environment.

In one or more arrangements, the occlusion status determination module(s) 185 can determine the occlusion status of an obstacle candidate. "Occlusion status" is the relative amount of occluded sensor data to total sensor data for an obstacle candidate. In one example, the occlusion status determination module(s) 185 can determine the occlusion status by determining a ratio of occluded LIDAR sensor data to total acquired LIDAR sensor data for the LIDAR sensor data acquired by the LIDAR sensor(s) 124 for an obstacle candidate. In one example, the occlusion status determination module(s) 185 can determine the occlusion status by determining a ratio of occluded RADAR sensor data to total acquired RADAR sensor data for the RADAR sensor data acquired by the RADAR sensor(s) 123 for an obstacle candidate. In one example, the occlusion status determination module(s) 185 can determine the occlusion status by determining a ratio of occluded visual data to total acquired visual data for the acquired visual data acquired by the camera(s) 126 for an obstacle candidate.

The vehicle 100 can include one or more obstacle classification modules 190. The obstacle classification module(s) 190 can assess the determined occlusion status for an obstacle candidate and determine an appropriate classification for the obstacle candidate, which, in turn, can be used by the autonomous driving module(s) 160 in determining a driving maneuver for the vehicle 100. The classification for an obstacle candidate can include a confidence level (e.g., high, mid, or low), a confidence value, and/or an identity of the obstacle candidate (e.g., a vehicle, a pedestrian, etc.).

In one or more arrangements, the obstacle classification module(s) 190 can compare the determined occlusion status to one or more predetermined occlusion status thresholds. In one or more arrangements, the determined occlusion status can be compared to a first occlusion status threshold and/or a second occlusion status threshold. The first occlusion status threshold and the second occlusion status threshold can be less than 1.0. The first occlusion status threshold can be greater than the second occlusion status threshold. In one example, the first occlusion status threshold can be about 0.75 or greater, about 0.7 or greater, about 0.65 or greater, about 0.6 or greater, about 0.55 or greater, or about 0.5 or greater, just to name a few possibilities. In one example, the second occlusion status threshold can be about 0.1 or greater, 0.15 or greater, about 0.2 or greater, about 0.25 or greater, about 0.3 or greater, about 0.35 or greater, or about 0.4 or greater, just to name a few possibilities. However, it will be understood that arrangements are not limited to these example values for the first occlusion status threshold or the second occlusion status threshold.

In one or more arrangements, the obstacle classification module(s) 190 can compare the determined occlusion status to the first occlusion status threshold. If the determined occlusion status is greater than the first occlusion status threshold, it can be indicative of the acquired sensor data being heavily occluded. The obstacle classification module(s) 190 can assign a low confidence to the obstacle candidate, thereby increasing the uncertainty of any classification of the obstacle candidate. In such case, the vehicle 100 can determine a conservative driving maneuver for the vehicle 100. "Conservative driving maneuver" means a driving maneuver that attempts to carefully operate relative to a heavily occluded obstacle so as to avoid a collision with the heavily occluded obstacle. The conservative driving maneuver may include sudden or drastic driving maneuvers, including sharp reductions in vehicle speed, bringing the vehicle to a stop, and/or violating traffic rules. The one or more data stores 115 can include traffic rules information.

If the determined occlusion status is less than the first occlusion status threshold, then the obstacle classification module(s) 190 can compare the determined occlusion status to the second occlusion status threshold. If the determined occlusion status is greater than the second occlusion status threshold, it can be indicative of the acquired sensor data being partially occluded. The obstacle classification module(s) 190 can assign a mid-range confidence level to the classification of the obstacle candidate. The obstacle classification module(s) 190 can use one or more partially occluded obstacle models from the obstacle model data 119 to identify the obstacle candidate.

It should be noted that, if the determined occlusion status is equal to the first occlusion status threshold, the obstacle classification module(s) 190 can treat it in any suitable manner. For instance, in one or more arrangements, when the determined occlusion status is equal to the first occlusion status threshold, the determined occlusion status can be treated the same as described above when the determined occlusion status is above the first occlusion status threshold. Alternatively, in one or more arrangements, when the determined occlusion status is equal to the first occlusion status threshold, the determined occlusion status can be treated the same as described above when the determined occlusion status is below the first occlusion status threshold.

If the determined occlusion status is less than the second occlusion status threshold, it can be indicative of a low level of occlusion of the acquired sensor data. The obstacle classification module(s) 190 can assign a higher confidence to the classification of the obstacle candidate, thereby reducing the uncertainty of any classification of the obstacle candidate. The obstacle classification module(s) 190 can use one or more full visibility obstacle models from the obstacle model data 119 to identify the obstacle candidate.

The obstacle classification module(s) 190 can analyze data/information acquired by the sensor system 120 to identify the nature of an obstacle candidate (e.g., whether the object is a vehicle, a person, etc.) using any suitable technique, including, for example, template matching and other kinds of computer vision and/or image processing techniques and/or other artificial or computational intelligence algorithms or machine learning methods. The obstacle classification module(s) 190 can include and/or have access to the obstacle model data 119. As an example, the obstacle classification module(s) 190 can also include any suitable obstacle recognition software. The obstacle recognition software can analyze data captured by the sensor system 120 (e.g., LIDAR data, RADAR data, visual data, etc.).

In one or more arrangements, the obstacle classification module(s) 190 can construct one or more partially occluded obstacle models and/or one or more fully visible obstacle models based on the acquired sensor data. The constructed obstacle model(s) can be compared to one or more partially occluded obstacle models and/or one or more full visibility obstacle models from the obstacle model data 119 to identify the obstacle candidate. In one or more arrangements, the obstacle model can be constructed based on a single type of acquired sensor data (e.g., LIDAR sensor data only, RADAR sensor data only, camera sensor data only, etc.). Alternatively, in one or more arrangements, the obstacle model can be constructed based on a plurality of different types of sensor data (e.g., multi-modality sensor data). As one example, the obstacle model can be constructed using both LIDAR sensor data and camera sensor data. However, it will be understood that the obstacle model can be constructed using sensor data acquired by any combination of two or more different types of environment sensors 122.

The obstacle classification module(s) 190 can query, analyze, search, and/or review the obstacle model data 119 for possible matches between a constructed obstacle model(s) and one or more models included in the obstacle model data 119. The obstacle classification module(s) 190 can identify the detected obstacle as a particular type of obstacle if there is a match between the sensor data an obstacle as defined by the obstacle model data 119. In one example, LIDAR data for an obstacle candidate can be compared to LIDAR point clouds in the obstacle model data 119 for possible matches. In another example, an obstacle model constructed using LIDAR sensor data, camera sensor data, and/or other environment sensor data can be compared to the obstacle model data 119 for possible matches. Alternatively or in addition, measurements or other aspects of sensor data captured by the sensor system 120 can be compared to measurements or other aspects of the obstacle model data 119. The obstacle classification module(s) 190 can identify the detected obstacle as a particular type of obstacle if there is a match between the sensor data an obstacle as defined by the obstacle model data 119.

In this context, "match" or "matches" means that sensor data collected by the sensor system 120 and one or more of the obstacle models in the obstacle model data 119 are substantially identical. For instance, the sensor data for an obstacle candidate collected by the sensor system 120 and one or more of the obstacle models in the obstacle model data 119 can match within a predetermined probability (e.g., at least about 85%, at least about 90%, at least about 95% or greater) or confidence level.

It should be noted that, if the determined occlusion status is equal to the first occlusion status threshold, the obstacle classification module(s) 190 can treat it in any suitable manner. For instance, in one or more arrangements, when the determined occlusion status is equal to the second occlusion status threshold, the determined occlusion status can be treated the same as described above when the determined occlusion status is above the second occlusion status threshold. Alternatively, in one or more arrangements, when the determined occlusion status is equal to the second occlusion status threshold, the determined occlusion status can be treated the same as described above when the determined occlusion status is below the second occlusion status threshold.

The obstacle models in the obstacle model data 119 can have information associated with them. For instance, such information can include the identity of the obstacle (e.g., a vehicle, a pedestrian, etc.), specific driving actions to take with respect to the obstacle, or manners of operation relative to the obstacle (e.g., conservative, standard, avoidance, etc.), and/or other information. The vehicle 100 can use such information to determine an appropriate driving maneuver for the vehicle 100.

In one or more arrangements, if there is a match between a partially occluded obstacle model and the partially occluded sensor data for an obstacle candidate, the vehicle 100 can determine a standard driving maneuver relative to such an obstacle. In this context, "standard driving maneuver" includes driving maneuvers that attempts to carefully avoid or reduce the likelihood of a collision with the occluded obstacle and/or to avoid or reduce the likelihood of a sudden or drastic driving maneuver. Examples of standard driving maneuvers can include changing travel lanes to be farther away from the hidden obstacle in the lateral direction 106, moving in the lateral direction 106 within a current travel lane of the vehicle 100, and/or a reducing a current speed of the vehicle, just to name a few possibilities. Conservative driving maneuvers can avoid drastic changes in the operation of the vehicle 100. Further, conservative driving maneuvers generally avoid violating traffic rules.

In one or more arrangements, if there is a match between a full visibility obstacle model and the acquired sensor data for an obstacle candidate, then there can be a high degree of confidence about the nature of the obstacle. Accordingly, the vehicle 100 can determine an appropriate driving maneuver relative to the obstacle as it otherwise normally would.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 150 to modify, adjust and/or alter one or more of the vehicle systems 140 or components thereof to responsive to receiving signals or other inputs from the processor(s) 110 and/or the autonomous driving module(s) 160. The one or more actuators 150 can include motors, pneumatic actuators, hydraulic pistons, relays, solenoids, and/or piezoelectric actuators, just to name a few possibilities.

Figure 2:
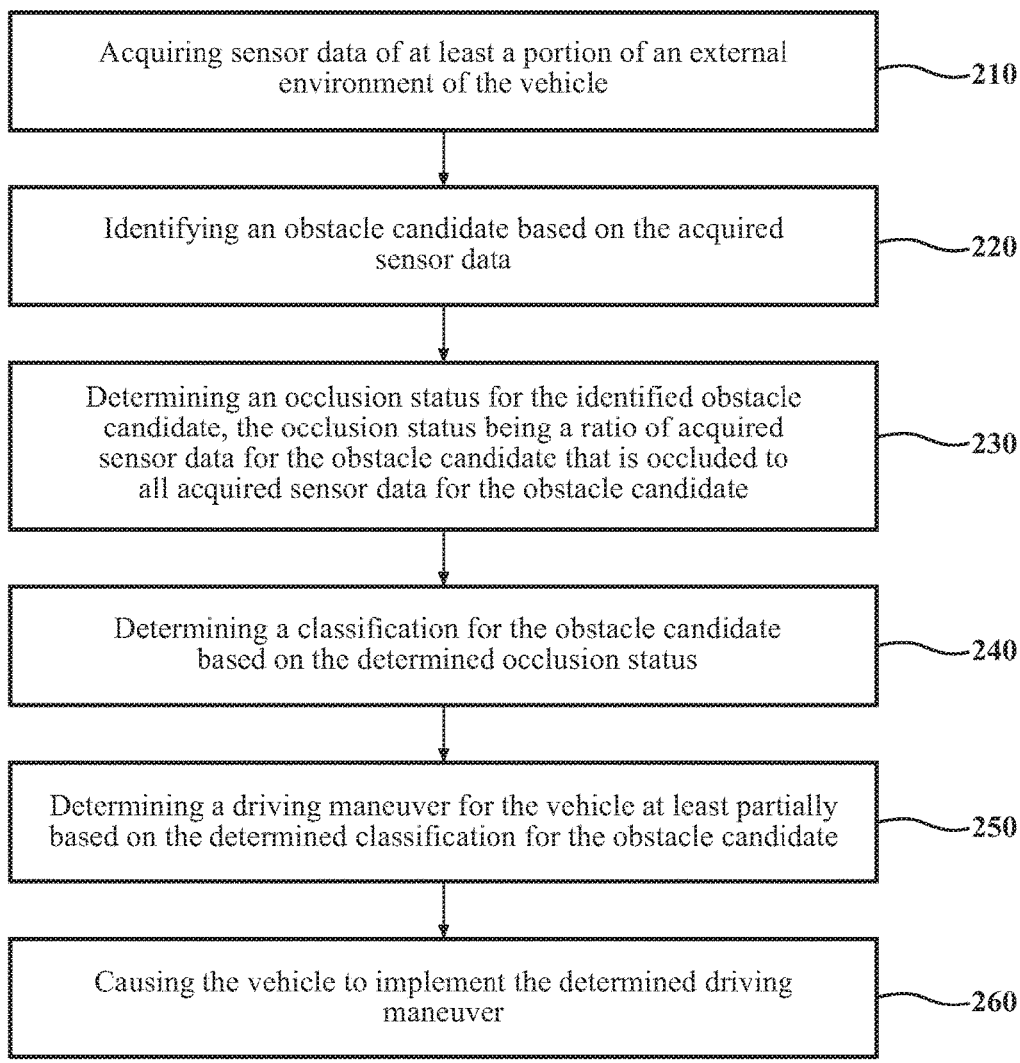
FIG. 2 is an example of a method of obstacle classification method for a vehicle.

Now that the various potential systems, devices, elements and/or components of the vehicle 100 have been described, various methods of detecting hidden obstacles using ray tracing will now be described. Referring now to FIG. 2, an example of an obstacle classification method for a vehicle is shown. Various possible steps of such methods will now be described. The method 200 illustrated in FIG. 2 may be applicable to the arrangements described above in relation to FIG. 1, but it is understood that the method 200 can be carried out with other suitable systems and arrangements. Moreover, the method 200 may include other steps that are not shown here, and in fact, the method 200 is not limited to including every step shown. The blocks that are illustrated here as part of the method 200 are not limited to the particular chronological order. Indeed, some of the blocks may be performed in a different order than what is shown and/or at least some of the blocks shown can occur simultaneously.

At block 210, sensor data of at least a portion of an external environment of the vehicle 100 can be acquired. The sensor data can be acquired by the sensor system 120. For instance, one or more sensors of the sensor system 120 can transmit one or more outbound sensor signals into the external environment of the vehicle 100. For instance, the outbound sensor signal(s) can be transmitted by one or more environment sensors 122 of the sensor system 120. As an example, the outbound sensor signal(s) can be transmitted by a LIDAR sensor 124, such as by a transmitter or a transceiver of the LIDAR sensor 124. Return signals can be received for at least some of the outbound sensor signals. The return signal(s) can be received by a receiver or a transceiver of the LIDAR sensor 124 or other environment sensor(s) 122. The method 200 can continue to block 220.

At block 220, an obstacle candidate in the external environment of the vehicle 100 can be identified based on the acquired sensor data. The identifying of the obstacle candidate can be performed by any suitable element or combination of elements of the vehicle 100. In one or more arrangements, the identifying of the obstacle candidate can be performed, at least in part, by the sensor system 120, the processor(s) 110, the autonomous driving module(s) 160, the data filtering module(s) 165, the data grouping module(s) 170, and/or the data tracking module(s) 175. The method 200 can continue to block 230.

At block 230, determining an occlusion status for the identified obstacle candidate. The occlusion status can be a ratio of acquired sensor data for the obstacle candidate that is occluded to all acquired sensor data for the obstacle candidate. The occlusion status can be determined in any suitable manner, such as by using ray tracing and/or based on predetermined criteria. The determining of the occlusion status can be performed by any suitable element or combination of elements of the vehicle 100. In one or more arrangements, the determining of the occlusion status can be performed, at least in part, by the ray tracing module(s) 180, the occlusion status determination module(s) 185, and/or the processor(s) 110. The method 200 can continue to block 240.

At block 240, a classification for the obstacle candidate can be determined based on the determined occlusion status. The classification for the obstacle candidate can be determined in any suitable manner. For instance, the determined occlusion status can be compared to one or more predetermined occlusion status thresholds, as described above in connection with the obstacle classification module(s) 190. The classification can include a confidence level (e.g., high, mid, low, and/or specific values) and/or a determination of the nature of the obstacle candidate (e.g., a vehicle, a person, etc.). The determining of the classification for the obstacle candidate can be performed by any suitable element or combination of elements of the vehicle 100. In one or more arrangements, the determining of the classification for the obstacle candidate can be performed, at least in part, by the obstacle classification module(s) 190/or the processor(s) 110. The method 200 can continue to block 250.

At block 250, a driving maneuver for the vehicle 100 can be at least partially based on the determined classification for the obstacle candidate. Such determining can be performed by any suitable element or combination of elements of the vehicle 100. In one or more arrangements, the determining can be performed, at least in part, by the autonomous driving module(s) 160, and/or the processor(s) 110.

For instance, the driving maneuver may be reducing the speed of the vehicle or stopping the vehicle when the obstacle candidate is classified with a low confidence. The driving maneuver can be determined by the processor(s) 110 and/or the autonomous driving module(s) 160. The method 200 can continue to block 260.

At block 260, the vehicle 100 can be caused to implement the determined driving maneuver. The vehicle 100 can be caused to implement the determined driving maneuver in any suitable manner. In one or more arrangements, the processor(s) 110 and/or the autonomous driving module(s) 160 can cause the vehicle 100 to implement the driving maneuver. The processor(s) 110 and/or the autonomous driving module(s) 160 can be operatively connected to one or more of the vehicle systems 140 to implement the determined driving maneuver. In one or more arrangements, the processor(s) 110 and/or the autonomous driving module(s) 160 can be operable to control the one or more actuators 150, which can control one or more of the vehicle systems 140 or portions thereof to implement the determined driving maneuver.

It should be noted that causing the driving maneuver to be implemented can be performed automatically. In one or more arrangements, a vehicle occupant (e.g. a driver and/or other passenger) can be prompted to provide permission to implement the driving maneuver. The vehicle occupant can be prompted in any suitable manner. For instance, a prompt can be presented on a display within the vehicle 100. Alternatively or in addition, the prompt can be audibly output to the vehicle occupant over one or more audial channels. Other forms of prompting can be used as an alternative or in addition to the above-described forms of prompting. Responsive to receiving an input corresponding to a vehicle occupant's approval to implement the driving maneuver, the vehicle 100 can be caused to implement the driving maneuver. In some instances, the driving maneuver can be implemented only if it is determined to be safe to do so. To that end, the vehicle 100 can consider the current driving environment, the road, adjacent lanes, other objects, etc.

When the vehicle 100 is caused to implement the driving maneuver, the method 200 can end. Alternatively, the method 200 can return to block 210 or some other block. As a further alternative, the method 200 can include additional and/or alternative blocks (not shown).

Non-limiting examples of the operation of the vehicle 100 and/or the method 200 will now be described in relation to FIGS. 4-9. FIGS. 4-5, FIGS. 6-7, and FIGS. 8-9 present different driving scenarios for the vehicle 100 that result in different obstacle classifications. Each driving scenario will be described in turn below. For purposes of these examples, the vehicle 100 can sense the driving environments using one or more LIDAR sensors 124; however, it will be understood that the use of one or more LIDAR sensors 124 is used merely to facilitate the description and arrangements are not limited to the use of the LIDAR sensors 124. Further, for purposes of these examples, there can be two predetermined occlusion status thresholds: a first occlusion status threshold and a second occlusion status threshold. For purposes of these examples, the first occlusion status threshold can be 0.5 and the second occlusion status threshold can be 0.1.

Figure 4:
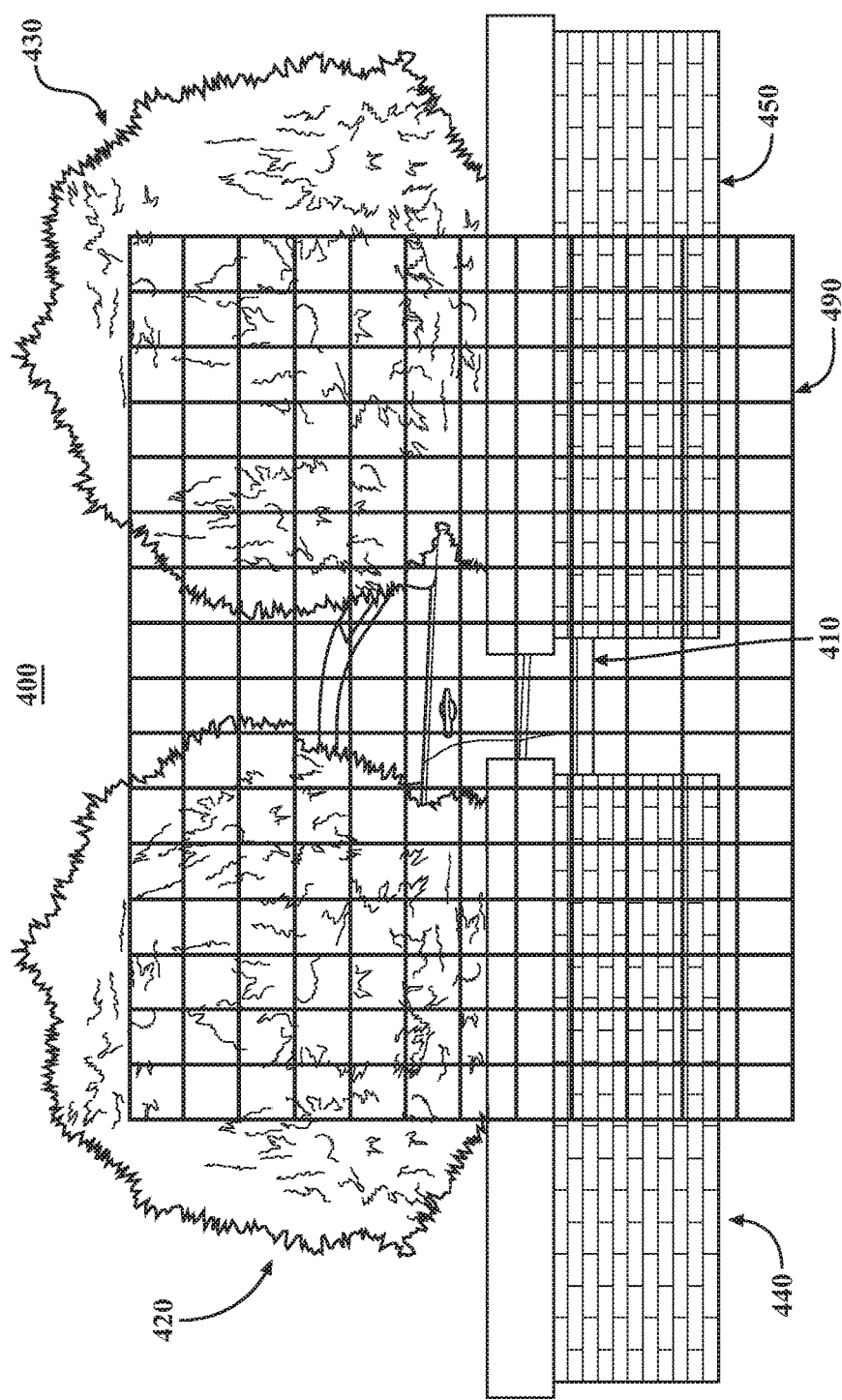
FIG. 4 is a view of an example of a driving scenario in which a vehicle is mostly obscured by other obstacles.

FIG. 4 is a view of an example of a driving environment 400 in which an obstacle is mostly obscured by other obstacles. In this particular example, a vehicle 410 is obscured by static obstacles (e.g., two plants 420, 430 and/or planters 440, 440 for the plants 420, 430). The vehicle 100 can use one or more LIDAR sensors 124 to acquire LIDAR data from at least a portion of the driving environment 400. The one or more LIDAR sensors 124 can transmit a plurality of outbound LIDAR sensor signals into the driving environment 400. The outbound LIDAR sensor signals can impinge upon the vehicle 410, the plant 420, the plant 430, the planter 440, and the planter 450, causing return LIDAR signals to be received by a receiver or a transceiver of the LIDAR sensor(s) 124.

The LIDAR sensor data acquired by the one or more LIDAR sensors 124 can include a plurality of object data points. The plurality of object data points may be grouped or clustered to form one or more three dimensional point clouds. The three dimensional point clouds can be used to identify an obstacle candidate. In this example, there can be point clouds for the vehicle 410, the plant 420/the planter 440, and the plant 430/the planter 450.

In some instances, the acquired LIDAR sensor data points can be filtered out to remove (or otherwise ignore) points located outside of one or more predetermined parameters. In one or more arrangements, such filtering out of the acquired object data points to points can be performed by the sensor data filtering module(s) 165. The filtering of the acquired LIDAR sensor data points can be performed before and/or after the grouping of the LIDAR sensor data points.

The LIDAR sensor data points for each obstacle candidate can be tracked to determine speed and/or other information about each obstacle candidate. The vehicle 100 (e.g., the sensor system 120, the processor(s) 110, and/or other module(s)) can associate data obtained by the LIDAR sensor(s) 124 (e.g., point data, point clusters) with data obtained by data obtained by the radar sensor(s) 123. Such association of the sensor data can provide more complete information about the driving environment and the objects therein. The association can be made based on or more suitable factors. For example, the association can be made if the data points obtained by the LIDAR sensor(s) 124 and the data points acquired by the radar sensor(s) 123 are located within a predetermined distance from each other.

FIG. 4 shows an imaginary grid 490 overlaid upon a portion of the driving environment 400. Each cell of the grid can represent a potential outbound sensor signal transmitted by the sensor system 120 or otherwise an area for data acquisition by the sensor system 120. If one of the cells of the grid 490 is empty, then no sensor data is acquired. If a cell at least partially includes an obstacle and/or at least a majority of the cell includes an obstacle, then sensor data is acquired.

Figure 5:
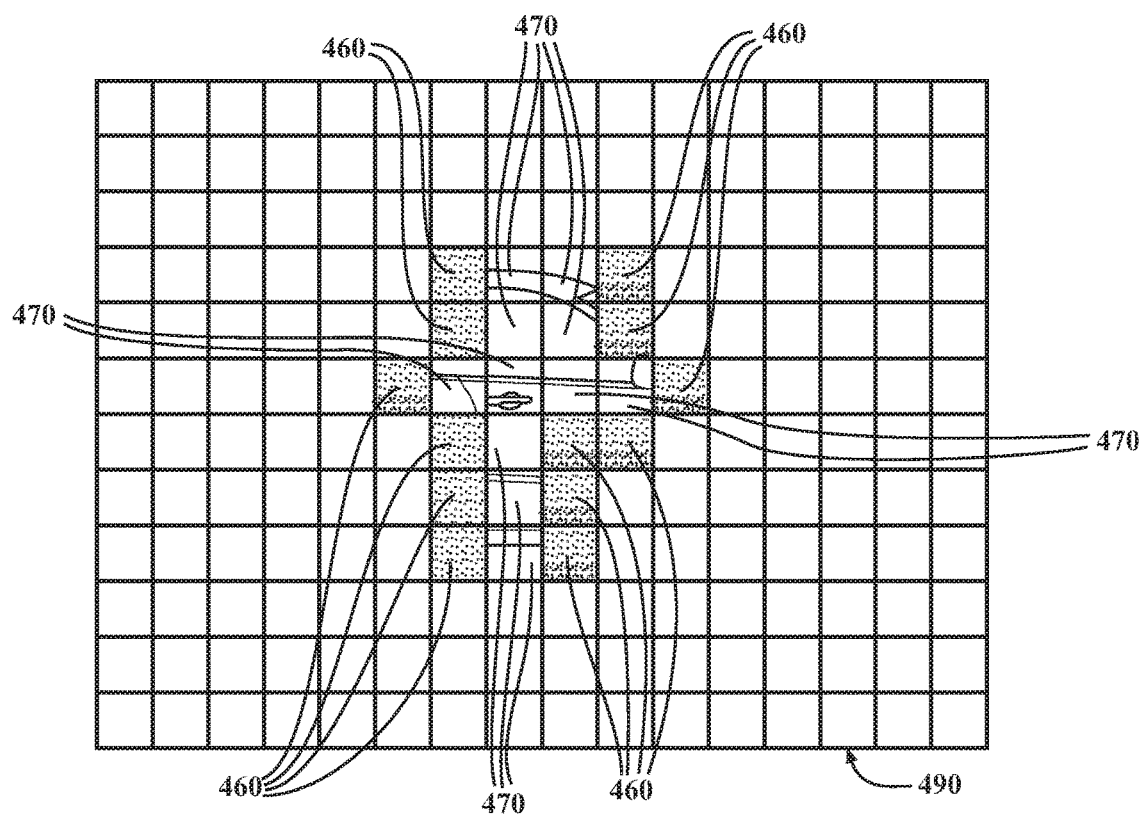
FIG. 5 is an example of a representation of the acquired sensor data for the mostly obscured vehicle of FIG. 4, showing the acquired sensor data being heavily occluded.

FIG. 5 is an example of a representation of the acquired LIDAR sensor data for the driving scenario of FIG. 4. In particular, FIG. 5 shows a representation of the acquired LIDAR sensor data for the vehicle 410. The acquired LIDAR sensor data can be analyzed to determine whether the acquired LIDAR sensor data is occluded or not occluded. Such a determination can be made by the ray tracing module(s) 180, the occlusion status determination module(s) 185, other module(s), and/or the processor(s) 110.

In one or more arrangements, the LIDAR sensor data that borders the LIDAR sensor data for the other obstacles (e.g., two plants 420, 430 and/or planters 440, 440 for the plants 420, 430) can, in one implementation, be automatically considered to be occluded. Alternatively, ray tracing can be applied to a static obstacle map 118 for the driving environment 400. Based on the static obstacle maps, LIDAR sensor data for the vehicle 410 might not be expected for the cells in which include both the vehicle 410 and at least one of the other obstacles.

FIG. 5 is an example of a representation of the acquired sensor data for the vehicle 410. One or more elements of the vehicle 100 can analyze the acquired sensor data to determine whether any of the acquired sensor data is occluded. In this example, the acquired sensor data for the vehicle 410 that borders the acquired sensor data for the plant 420/the planter 440 and/or the plant 430/the planter 450 can be determined to be occluded sensor data 460. The other sensor data can be determined to be non-occluded sensor data 470.

The occlusion status determination module(s) 185 and/or the processor(s) 110 can determine the occlusion status for the vehicle 410. In this example, the acquired sensor data for the vehicle 410 can include a total of 24 object data points. Of these 24 object data points, 13 of the object data points can be determined to be occluded sensor data 460. The occlusion status for the vehicle 410 can be determined to be a ratio of occluded sensor data 460 for the vehicle 410 to total sensor data (occluded sensor data 460+non-occluded sensor data 470) for the vehicle 401. Thus, in this example, the ratio is 13:24 or 0.542.

The determined occlusion status can be compared to a first occlusion status threshold. Again, in this example, the first occlusion status threshold can be 0.5. Thus, the determined occlusion status is above the first occlusion status threshold, thereby indicating a heavily occluded obstacle. As a result, the classification for the obstacle candidate can be determined to be indeterminate and/or assigned a low confidence value. In such case, a conservative driving maneuver can be determined for the vehicle 100. The vehicle 100 can be caused to implement the determined driving maneuver. In some instances, when the acquired sensor data is determined to be indeterminate and/or assigned a low confidence value, the acquired sensor data may not be analyzed relative to the obstacle model data 119 to identify the obstacle candidate.

Figure 6:
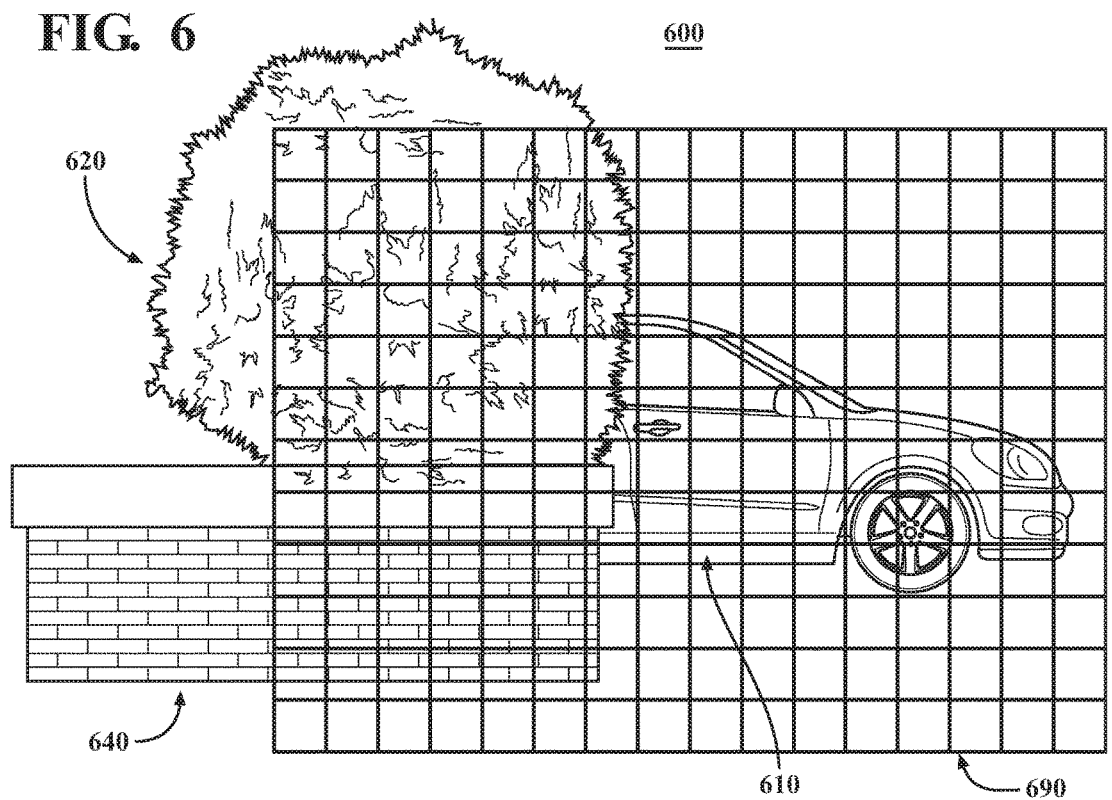
FIG. 6 is a view of an example of a driving scenario in which a vehicle is partially obscured by another obstacle.

FIG. 6 is a view of an example of a driving environment 600 in which an obstacle is partially obscured by other obstacles. An imaginary grid 690 is overlaid upon a portion of the driving environment 600. Each cell of the grid can represent a potential outbound sensor signal transmitted by the sensor system 120 or otherwise an area for data acquisition by the sensor system 120. If one of the cells of the grid 690 is empty, then no sensor data is acquired. If a cell at least partially includes an obstacle and/or at least a majority of the cell includes an obstacle, then sensor data is acquired. In this particular example, a vehicle 610 is obscured by a static obstacles (e.g., a plant 620 and/or a planter 640 for the plant 620). The vehicle 100 can use one or more sensors from the sensor system 120 (e.g., LIDAR sensors 124) to acquire sensor data from at least a portion of the driving environment 600. Based on the acquired sensor data, obstacle candidates in the driving environment 600 can be identified. In this example, there can be an obstacle candidate for the vehicle 610 and for the plant 620/the planter 640.

Figure 7:
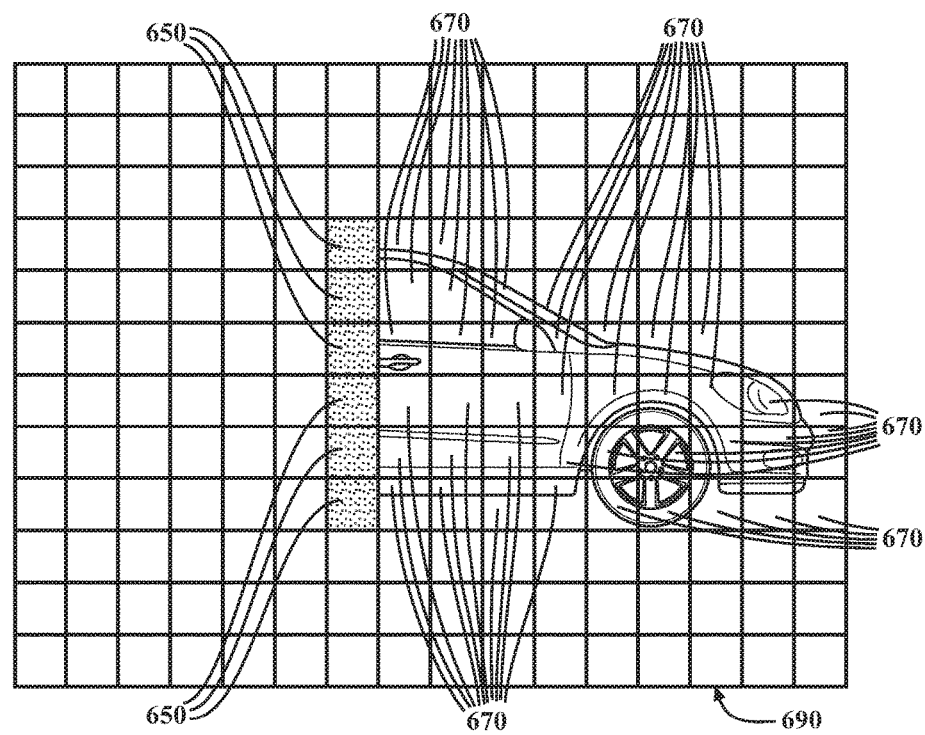
FIG. 7 is an example of a representation of the acquired sensor data for the partially obscured vehicle of FIG. 6, showing the acquired sensor data being partially occluded.

FIG. 7 is an example of a representation of the acquired sensor data for the vehicle 610. One or more elements of the vehicle 100 can analyze the acquired sensor data to determine whether any of the acquired sensor data is occluded. In this example, the acquired sensor data for the vehicle 610 that borders the acquired sensor data for the plant 620/the planter 640 can be determined to be occluded sensor data 650. The other sensor data can be determined to be non-occluded sensor data 670.

The occlusion status determination module(s) 185 and/or the processor(s) 110 can determine the occlusion status for the vehicle 610. In this example, the acquired sensor data for the vehicle 610 can include a total of 47 object data points. Of these 47 object data points, 6 of the object data points can be determined to be occluded. The occlusion status for the vehicle 610 can be determined to be a ratio of occluded sensor data for the vehicle 610 to total sensor data for the vehicle 610. Thus, in this example, the ratio is 6:47 or 0.127.

The determined occlusion status can be compared to a first occlusion status threshold. Again, in this example, the first occlusion status threshold is 0.5. Thus, the determined occlusion status is below the first occlusion status threshold. As a result, the determined occlusion status can be compared to a second occlusion status threshold. Again, in this example, the second occlusion status threshold can be 0.1. The determined occlusion status is above the second occlusion status threshold. Therefore, a classification for the obstacle candidate can be determined using one or more partially occluded obstacle models.

In one or more arrangements, the acquired sensor data for the vehicle 610 can be compared to the one or more partially occluded obstacle models included in the obstacle model data 119. In one or more arrangements, a partially obscured obstacle model for the vehicle 610 can be constructed using one or more modalities of acquired sensor data, and such constructed partially obscured obstacle model can be compared to the one or more partially occluded obstacle models included in the obstacle model data 119. In this example, the acquired sensor data for the vehicle 610 and/or the constructed partially obscured obstacle model for the vehicle 610 can match one of the partially obscured models 304 (FIG. 3) included in the obstacle model data 119. As a result, a classification for the obstacle candidate can be determined based on a predetermined classification associated with the partially occluded obstacle model that the obstacle candidate matches. As an example, since the matching obstacle model is for a vehicle, a predetermined classification can be a vehicle and proceed with caution and/or with a mid-range level of confidence. As such an appropriate driving maneuver may be to slightly reduce speed or to maintain a current speed. The vehicle 100 can be caused to implement the determined driving maneuver.

Figure 8:
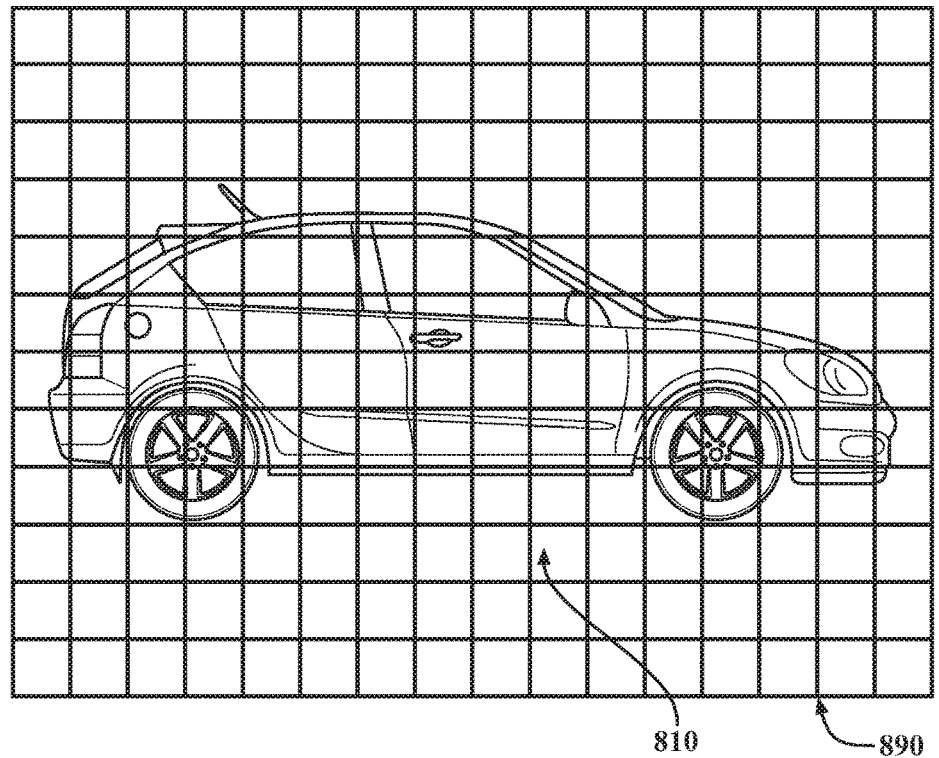
FIG. 8 is a view of an example of a driving scenario in which a vehicle is not obscured by other obstacles.
Figure 9:
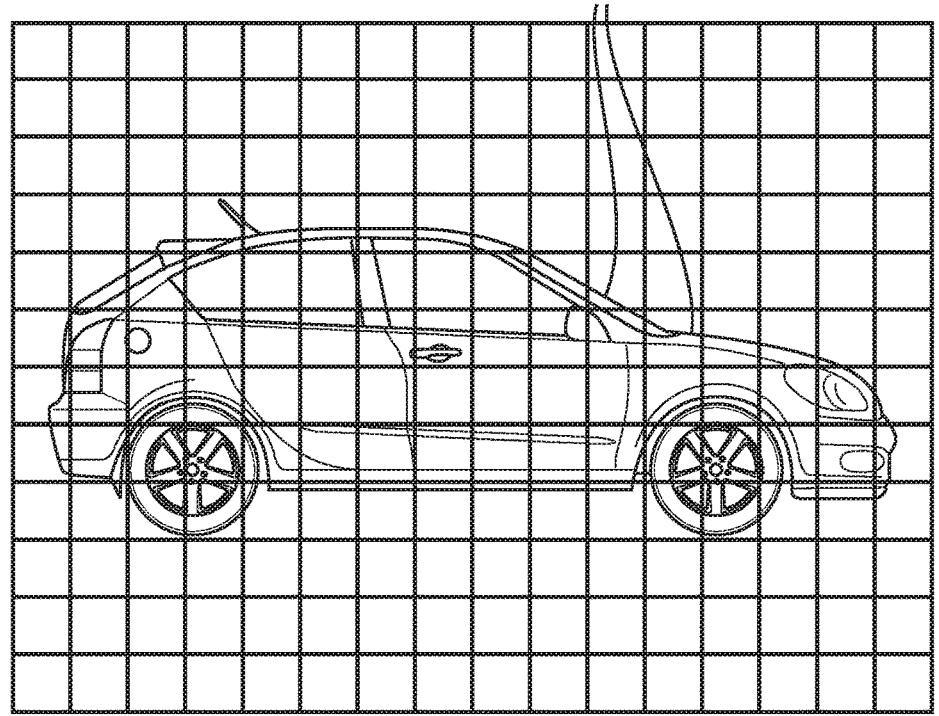
FIG. 9 is an example of a representation of the acquired sensor data for the vehicle of FIG. 8, showing the acquired sensor data being non-occluded.

FIG. 8 is a view of an example of a driving environment 800 in which an obstacle (e.g., vehicle 810) is not obscured by other obstacles. The vehicle 100 can use one or more sensors from the sensor system 120 to acquire sensor data from at least a portion of the driving environment 800. Based on the acquired sensor data, obstacle candidates in the driving environment 800 can be identified. In this example, there can be an obstacle candidate for the vehicle 810. FIG. 9 is an example of a representation of the acquired sensor data for the vehicle 810. One or more elements of the vehicle 100 can analyze the acquired sensor data to determine whether any of the acquired sensor data is occluded. In this example, none of the acquired sensor data for the vehicle 810 is determined to be occluded; therefore, all sensor data points for the vehicle 810 are not occluded sensor data points 870.

The occlusion status determination module(s) 185 and/or the processor(s) 110 can determine the occlusion status for the vehicle 810. In this example, the acquired sensor data for the vehicle 810 can include a total of 93 object data points. Of these 93 object data points, zero can be determined to be occluded. The occlusion status for the vehicle 810 can be determined to be a ratio of occluded sensor data for the vehicle 810 to total sensor data for the vehicle 810. Thus, in this example, the ratio is 0:93 or 0.

The determined occlusion status can be compared to a first occlusion status threshold. Again, in this example, the first occlusion status threshold is 0.5. Thus, the determined occlusion status is below the first occlusion status threshold. As a result, the determined occlusion status can be compared to a second occlusion status threshold. Again, in this example, the second occlusion status threshold is 0.1. As a result, the determined occlusion status is below the second occlusion status threshold. Therefore, a classification for the obstacle candidate can be determined using one or more full visibility obstacle models.

In one or more arrangements, the acquired sensor data for the vehicle 810 can be compared to the one or more full visibility obstacle models included in the obstacle model data 119. In one or more arrangements, a full visibility obstacle model for the vehicle 810 can be constructed using one or more modalities of acquired sensor data, and such constructed full visibility obstacle model can be compared to the one or more full visibility obstacle models included in the obstacle model data 119. If one of the obstacle models in the obstacle model data 119 matches the acquired sensor data for the vehicle 810 and/or the constructed partially obscured obstacle model for the vehicle 810, then the vehicle 100 can determine and implement an appropriate driving maneuver with respect to such an obstacle.

It will be appreciated that arrangements described herein can provide numerous benefits, including one or more of the benefits mentioned herein. For example, arrangements described herein can improve the performance and/or safety of a vehicle. Arrangements described here can facilitate the smooth operation of a vehicle by providing a more refined classification of obstacles under occlusion. Arrangements described herein can avoid or minimize sudden, unnecessary, and/or drastic vehicle actions (e.g., lane shifts, lane changes or vehicle stops) that may otherwise occur due to a mischaracterization of an obstacle under occlusion. Arrangements described herein can provide an efficient manner of determining occlusion status. Arrangements described herein can determine appropriate driving maneuvers for the vehicle based on the determined occlusion status.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing.

Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An obstacle classification method for a vehicle, the method comprising:
    acquiring, using one or more sensors, sensor data of at least a portion of an external environment of the vehicle;
    identifying, using a processor, an obstacle candidate based on the acquired sensor data;
    determining an occlusion status for the identified obstacle candidate, the occlusion status being a ratio of acquired sensor data for the obstacle candidate that is occluded to all acquired sensor data for the obstacle candidate, the acquired sensor data for the obstacle candidate that is occluded being defined by any acquired sensor data points for the obstacle candidate that are substantially adjacent to acquired sensor data points for one or more other obstacle candidates;
    determining a classification for the obstacle candidate based on the determined occlusion status;
    determining a driving maneuver for the vehicle at least partially based on the determined classification for the obstacle candidate; and
    causing the vehicle to implement the determined driving maneuver.

2. The method of claim 1, wherein determining a classification for the obstacle candidate based on the determined occlusion status includes:
    comparing the determined occlusion status to a first occlusion status threshold; and
    if the determined occlusion status is above the first occlusion status threshold, determining the classification for the obstacle candidate as being indeterminate.

3. The method of claim 2, wherein, if the classification for the obstacle candidate is determined as being indeterminate, the driving maneuver is a conservative driving maneuver.

4. The method of claim 1, wherein the one or more sensors are one or more LIDAR sensors, and wherein the acquired sensor data is a plurality of object data points.

5. The method of claim 1, further including determining whether the acquired sensor data for the obstacle candidate is occluded.

6. The method of claim 5, wherein determining whether the acquired sensor data for the obstacle candidate is occluded is performed using ray tracing.

7. An obstacle classification method for a vehicle, the method comprising:
    acquiring, using one or more sensors, sensor data of at least a portion of an external environment of the vehicle;
    identifying, using a processor, an obstacle candidate based on the acquired sensor data;
    determining an occlusion status for the identified obstacle candidate, the occlusion status being a ratio of acquired sensor data for the obstacle candidate that is occluded to all acquired sensor data for the obstacle candidate;
    determining a classification for the obstacle candidate based on the determined occlusion status, the determining including:
        comparing the determined occlusion status to a first occlusion status threshold;
        if the determined occlusion status is above the first occlusion status threshold, determining the classification for the obstacle candidate as being indeterminate;
        if the determined occlusion status is below the first occlusion status threshold, comparing the determined occlusion status to a second occlusion status threshold, the second occlusion status threshold being less than the first occlusion status threshold; and
        if the determined occlusion status is above the second occlusion status threshold, determining the a classification for the obstacle candidate using one or more partially occluded obstacle models;
    determining a driving maneuver for the vehicle at least partially based on the determined classification for the obstacle candidate; and
    causing the vehicle to implement the determined driving maneuver.

8. The method of claim 7, wherein, if the obstacle candidate matches a partially occluded obstacle model, determining the classification for the obstacle candidate is based on a predetermined classification associated with the partially occluded obstacle model that the obstacle candidate matches.

9. The method of claim 7, further including:
    if the determined occlusion status is below the second occlusion status threshold, determining the classification for the obstacle candidate using one or more full visibility obstacle models.

10. The method of claim 7, wherein the acquired sensor data for the obstacle candidate that is occluded includes at least all border sensor data for the obstacle candidate.

11. An obstacle classification system for a vehicle, the system comprising:
    a sensor system including one or more sensors, the one or more sensors being configured to acquire sensor data of at least a portion of an external environment of the vehicle;
    one or more actuators; and
    a processor operatively connected to the sensor system, the processor operatively connected to the one or more actuators, the processor being programmed to initiate executable operations comprising:
        identifying an obstacle candidate based on the acquired sensor data;
        determining an occlusion status for the identified obstacle candidate, the occlusion status being a ratio of acquired sensor data for the obstacle candidate that is occluded to all acquired sensor data for the obstacle candidate, the acquired sensor data for the obstacle candidate that is occluded being defined by any acquired sensor data points for the obstacle candidate that are substantially adjacent to acquired sensor data points for one or more other obstacle candidates;
        determining a classification for the obstacle candidate based on the determined occlusion status;
        determining a driving maneuver for the vehicle at least partially based on the determined classification for the obstacle candidate; and
        activating one or more actuators to cause the vehicle to implement the determined driving maneuver.

12. The system of claim 11, wherein determining a classification for the obstacle candidate based on the determined occlusion status includes:
    comparing the determined occlusion status to a first occlusion status threshold; and
    if the determined occlusion status is above the first occlusion status threshold, determining the classification for the obstacle candidate as being indeterminate.

13. The system of claim 12, wherein, if the classification for the obstacle candidate is determined as being indeterminate, the driving maneuver is a conservative driving maneuver.

14. The system of claim 11, wherein the one or more sensors are one or more LIDAR sensors, and wherein the acquired sensor data is a plurality of object data points.

15. The system of claim 11, wherein the executable operations further include:
    determining whether the acquired sensor data for the obstacle candidate is occluded.

16. The system of claim 15, wherein determining whether the acquired sensor data for the obstacle candidate is occluded is performed using ray tracing.

17. An obstacle classification system for a vehicle, the system comprising:
    a sensor system including one or more sensors, the one or more sensors being configured to acquire sensor data of at least a portion of an external environment of the vehicle;
    one or more actuators; and
    a processor operatively connected to the sensor system, the processor operatively connected to the one or more actuators, the processor being programmed to initiate executable operations comprising:
        identifying an obstacle candidate based on the acquired sensor data;
        determining an occlusion status for the identified obstacle candidate, the occlusion status being a ratio of acquired sensor data for the obstacle candidate that is occluded to all acquired sensor data for the obstacle candidate;
        determining a classification for the obstacle candidate based on the determined occlusion status, the determining including:

comparing the determined occlusion status to a first occlusion status threshold;

if the determined occlusion status is above the first occlusion status threshold, determining the classification for the obstacle candidate as being indeterminate;

if the determined occlusion status is below the first occlusion status threshold, comparing the determined occlusion status to a second occlusion status threshold, the second occlusion status threshold being less than the first occlusion status threshold; and if the determined occlusion status is above the second occlusion status threshold, determining the classification for the obstacle candidate using one or more partially occluded obstacle models;

determining a driving maneuver for the vehicle at least partially based on the determined classification for the obstacle candidate; and activating one or more actuators to cause the vehicle to implement the determined driving maneuver.

18. The system of claim 17, wherein the executable operations further include:

if the obstacle candidate matches a partially occluded obstacle model, determining the classification for the obstacle candidate is based on a predetermined classification associated with the partially occluded obstacle model that the obstacle candidate matches.

19. The system of claim 17, wherein the executable operations further include:

if the determined occlusion status is below the second occlusion status threshold, determining the classification for the obstacle candidate using one or more full visibility obstacle models.

20. The system of claim 17, wherein the acquired sensor data for the obstacle candidate that is occluded includes at least all border sensor data for the obstacle candidate.

* * * * *